United States Patent [19]
Bennett

[11] Patent Number: 5,291,869
[45] Date of Patent: Mar. 8, 1994

[54] LIQUIFIED PETROLEUM GAS FUEL SUPPLY SYSTEM

[76] Inventor: David E. Bennett, 14687 County Rd. 8 SE., Lake Lillian, Minn. 56253

[21] Appl. No.: 69,199

[22] Filed: May 28, 1993

[51] Int. Cl.$^5$ .................. F02B 43/00; F02M 15/00
[52] U.S. Cl. .................. 123/527; 123/41.31; 123/541
[58] Field of Search .......... 123/527, 456, 41.31, 123/541, 27 GE, 472, 468, 469, 470; 239/585

[56] References Cited

U.S. PATENT DOCUMENTS

| | | |
|---|---|---|
| 1,860,063 | 5/1932 | Tobler . |
| 1,966,223 | 7/1934 | Sass .................. 123/41.31 |
| 2,264,914 | 12/1941 | L'Orange . |
| 2,286,658 | 6/1942 | Voit . |
| 2,886,014 | 5/1959 | Konrad et al. . |
| 3,398,895 | 8/1968 | Claffey . |
| 3,451,627 | 6/1969 | Barber . |
| 3,945,353 | 3/1976 | Dreisin .................. 123/41.31 |
| 4,421,087 | 12/1983 | Schuurman . |
| 4,489,700 | 12/1984 | Van Der Weide .................. 123/527 |
| 4,503,826 | 3/1985 | Kessler et al. . |
| 4,503,831 | 3/1985 | Rijkeboer .................. 123/527 |
| 4,503,832 | 3/1985 | Pelfley .................. 123/527 |
| 4,700,891 | 10/1987 | Hans et al. . |
| 4,957,085 | 9/1990 | Suerdlin .................. 123/41.31 |
| 5,033,444 | 7/1991 | Kaufman .................. 123/527 |
| 5,044,339 | 9/1991 | Hafner .................. 123/456 |
| 5,076,244 | 12/1991 | Donaldson .................. 123/527 |
| 5,233,963 | 8/1993 | Gregorius .................. 123/456 |
| 5,237,981 | 8/1993 | Polletta .................. 123/527 |

FOREIGN PATENT DOCUMENTS

| | | |
|---|---|---|
| WO81/00282 | 2/1981 | PCT Int'l Appl. . |
| WO92/08886 | 5/1992 | PCT Int'l Appl. . |
| WO92/08888 | 5/1992 | PCT Int'l Appl. . |

Primary Examiner—Carl S. Miller
Attorney, Agent, or Firm—Merchant, Gould, Smith, Edell, Welter & Schmidt

[57] ABSTRACT

A fuel supply system for providing liquified petroleum gas ("LPG") fuel in a liquid state to intake manifold of internal combustion engine, including a fuel supply assembly and a fuel injecting mechanism. Fuel supply assembly includes a fuel rail assembly containing both supply and return channels. Fuel injecting mechanism is in fluid communication with supply and return channels of fuel rail assembly. Injected LPG is maintained liquid through refrigeration both along fuel rail assembly and within fuel injecting mechanism. Return fuel in both fuel rail assembly and fuel injecting mechanism is used to effectively cool supply fuel to a liquid state prior to injection into intake manifold of engine.

10 Claims, 4 Drawing Sheets

LIQUIFIED PETROLEUM GAS FUEL SUPPLY SYSTEM

INCORPORATION BY REFERENCE

Applicant's copending applications entitled "Fuel Rail for Internal Combustion Engine," "Liquified Petroleum Gas Fuel Injector," and "Fuel Pressure Regulator and Method for Purging," all filed on even date herewith and commonly owned are incorporated by reference.

FIELD OF THE INVENTION

This invention relates to a liquified petroleum gas fuel injection system for use in an internal combustion engine.

BACKGROUND OF THE INVENTION

Interest in alternative fuels such as liquified petroleum gas ("LPG") has increased in recent years due to the inherent cost and environmental advantages over other fuels. LPG has particularly received much attention as an alternative to gasoline or diesel for use in internal combustion engines. Propane, the primary constituent of LPG, is a byproduct of the refining of gasoline, and it is a byproduct of the transfer of natural gases in pipelines. It is readily available and at costs far below that of gasoline.

LPG was recently listed under the Clean Air Act in the United States as a suggested alternative fuel because it is more environmentally compatible than gasoline. LPG burns more completely, producing less carbon monoxide and hydrocarbon emissions. Also, using LPG as a fuel reduces the emission of volatile organic compounds which occurs during gasoline refueling.

The United States Federal Government recently promulgated legislation, referred to as Corporate Average Fuel Efficiency ("CAFE") standards, to promote the use of more environmentally compatible fuels. CAFE created a system of incentives which encourages manufacturers to build automobiles and trucks which use alternative fuels such as LPG. As a result, there is increased interest in manufacturing and retrofitting automobiles and trucks with LPG fuel systems.

The injection of liquid fuels such as gasoline into internal combustion engines is well known (see U.S. Pat. No. 4,700,891). Such fuel injectors create fine atomization of liquid fuel, which improves the efficiency of the burning cycle.

Although LPG in its gaseous form has been used as a reasonably effective fuel in internal combustion engines, there is an associated reduction in power capability as compared to liquid LPG fuels. This power reduction is mainly due to the reduced amount of air and fuel which can be drawn into the intake manifold when the LPG enters the manifold in gaseous form.

With liquid LPG, a further gain in peak power (and simultaneous reduction in the emission of nitrous oxides) results from the cooling of air and fuel within the intake manifold from vaporization of injected LPG. This also reduces the tendency for engine knock.

Use of LPG in liquid form as a fuel is fairly new in the art. However, several obstacles are associated with attempting to inject liquid LPG directly into the intake manifold of an internal combustion engine. In particular, it is difficult to maintain LPG in its liquid state near the heated engine compartment. LPG has a very low boiling point (see FIG. 4 for the liquid-vapor phase boundaries for propane and isobutane, the primary constituents of LPG). Even under pressure, LPG will tend to bubble or boil as the boiling temperature at a given pressure is approached. The formation of bubbles, often called "champagning" or "flashing," can cause inconsistent injection and poor air/fuel ratio control.

Various approaches to cooling LPG to ensure injection of a homogeneously liquid fuel have been attempted. Examples include using metered LPG to cool the injected fuel to a liquid state (see U.S. Pat. No. 4,489,700), and employing a spool tip at the injection nozzle to cool the injected LPG (see U.S. Pat. No. 5,076,244). However, previous approaches have in large part been unsuccessful, particularly in maintaining the LPG injected into the manifold in a fully liquid state throughout the operating range of the engine, as for example at idle.

Consequently, it is clear that an improved, efficient and effective LPG injection system which can maintain the injected LPG in a fully liquid state throughout the operating range of an internal combustion engine continues to be needed.

SUMMARY OF THE INVENTION

According to the present invention, a fuel supply system for providing LPG to an internal combustion engine in a fully liquid state throughout its operating range is provided.

The system of the present invention comprises a fuel injecting mechanism and a fuel supply assembly for supplying liquified petroleum gas to the fuel injecting mechanism. The fuel supply assembly includes a fuel rail assembly containing both supply and return channels. The fuel injecting mechanism is in operable fluid communication with the supply and return channels of the fuel rail assembly.

The present invention maintains LPG injected into the engine intake manifold in a fully liquid state by means of refrigeration both along the fuel rail and within the injecting mechanism. That is, return fuel in both the fuel rail and fuel injecting mechanism is used to effectively cool the supply fuel to a liquid state prior to injection into the intake manifold of the engine.

The present invention addresses the problems associated with the prior art and maintains injected LPG in a fully liquid state, without the formation of vapor bubbles, throughout the operation range of the engine. This allows more fuel and air to enter the intake manifold prior to the closing of the intake valve, and the vaporization of LPG in the intake manifold cools the fuel and air. The result is improved power output, lower toxic emissions, and a reduction in engine knock. As a consequence of the present invention, there is now an excitement within the automobile industry that LPG may finally be useable on a wide scale.

The invention will be better understood and further advantages thereof will become more apparent from the ensuing detailed description of the preferred embodiment taken in conjunction with the drawings and claims annexed hereto.

DETAILED DESCRIPTION OF THE PREFERRED EMBODIMENT

Figure 1:
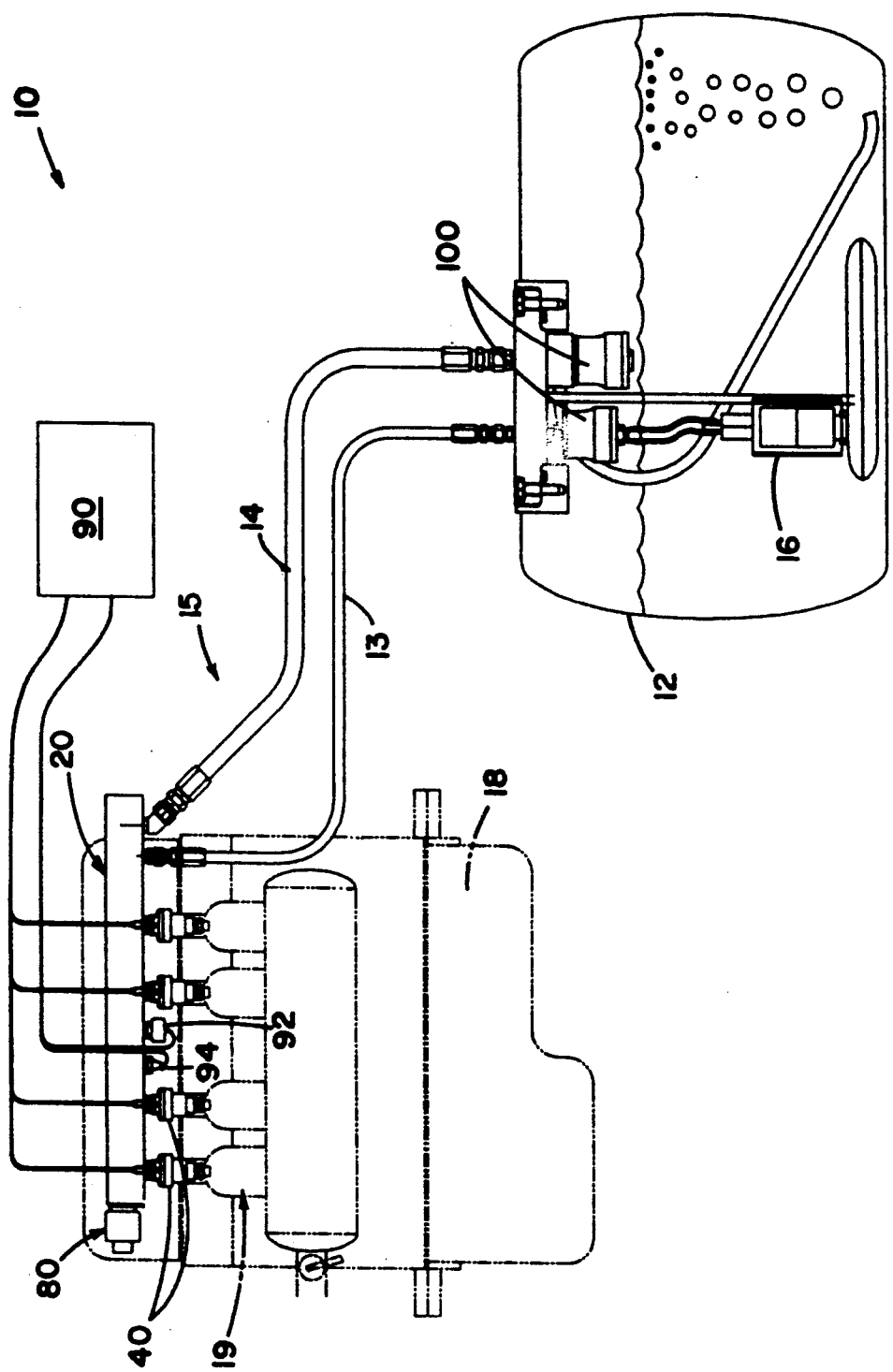
FIG. 1 is a schematic diagram of a system according to the present invention.

Referring now to the drawings, wherein like numerals designate like parts throughout the various figures, and referring in particular to FIG. 1, a fuel supply system 10 for providing liquified petroleum gas ("LPG") fuel to an internal combustion engine 18 is shown. System 10 has a fuel supply assembly 15 for supplying fuel to injection mechanism 40. Fuel supply assembly 15 includes fuel tank 12, fuel supply line 13, fuel return line 14, fuel pump 16, fuel rail assembly 20, and fuel pressure regulator 80.

Figure 3:
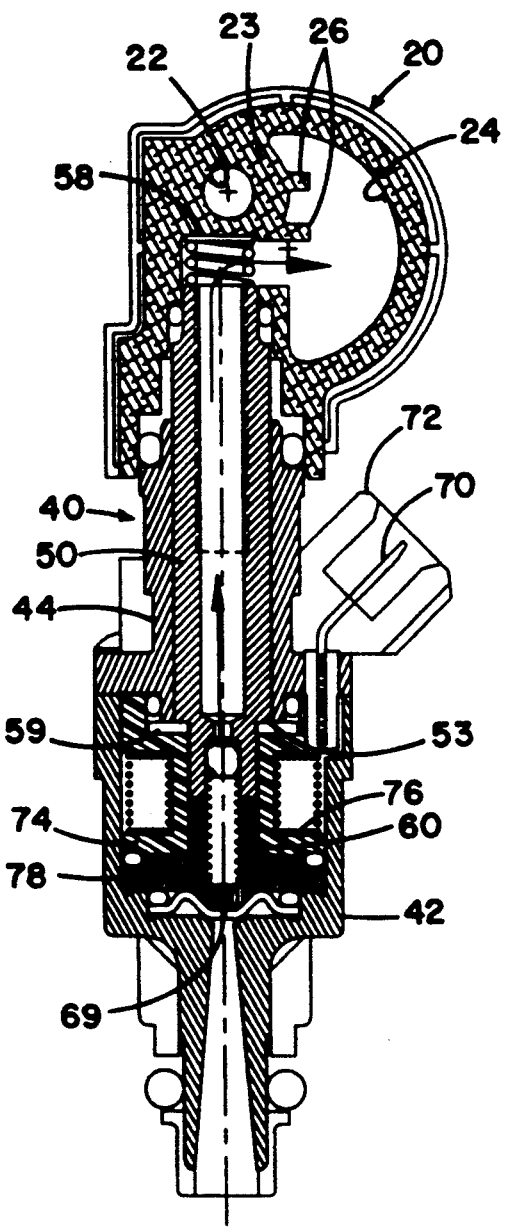
FIG. 3 is an enlarged cross-sectional side view of the fuel injecting mechanism and fuel rail assembly in FIG. 2, taken along the line 3—3.
Figure 4:
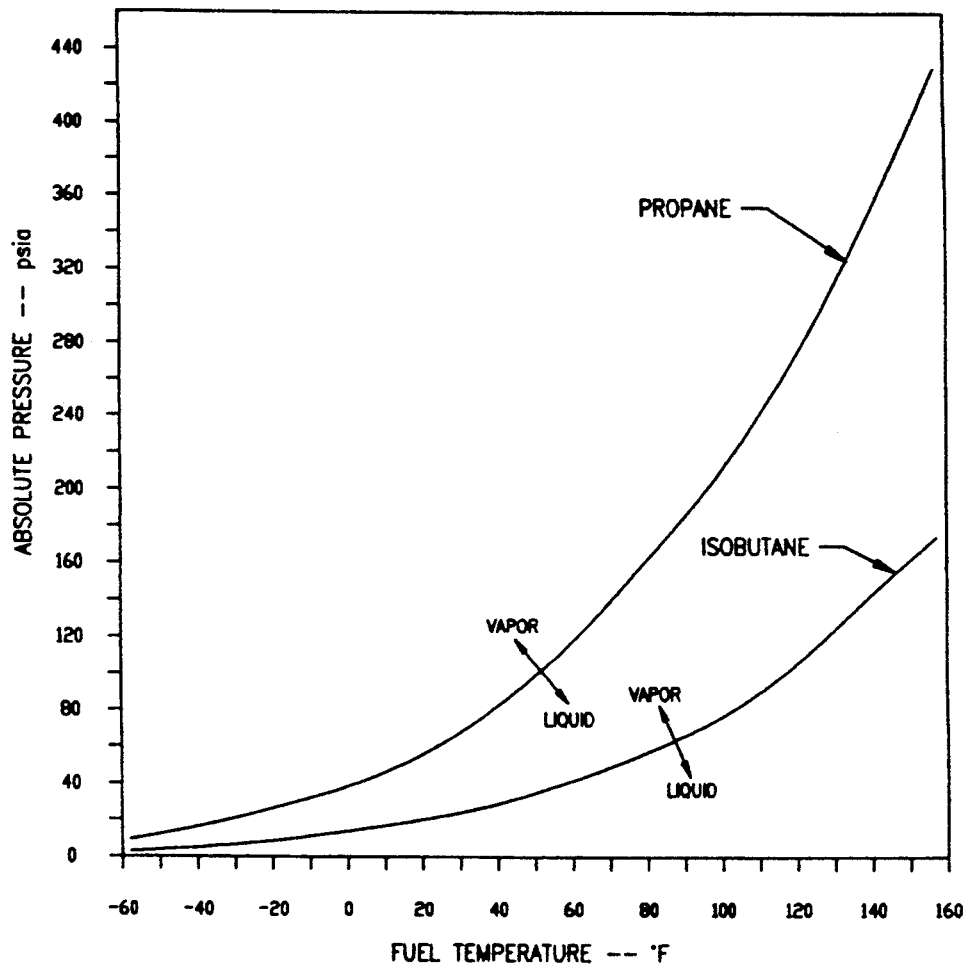
FIG. 4 depicts the liquid-vapor phase boundaries for propane and isobutane.

Fuel supply line 13 and fuel return line 14 are connected to fuel supply channel 22 and fuel return channel 24, respectively, of fuel rail assembly 20. Fuel supply 22 and return 24 channels are aligned substantially parallel (see FIG. 3), fuel return channel 24 having a cross-sectional area at least four and preferably about six to ten times larger than fuel supply channel 22. Although the cross-sectional shape of fuel rail 20 as depicted in FIG. 3 is asymmetric to allow close fitting of other engine components, a symmetrical or other shaped design could also be used. Fuel rail assembly 20 is preferably manufactured as an aluminum extrusion, fuel supply 22 and fuel return 24 channels being formed therein.

Figure 2:
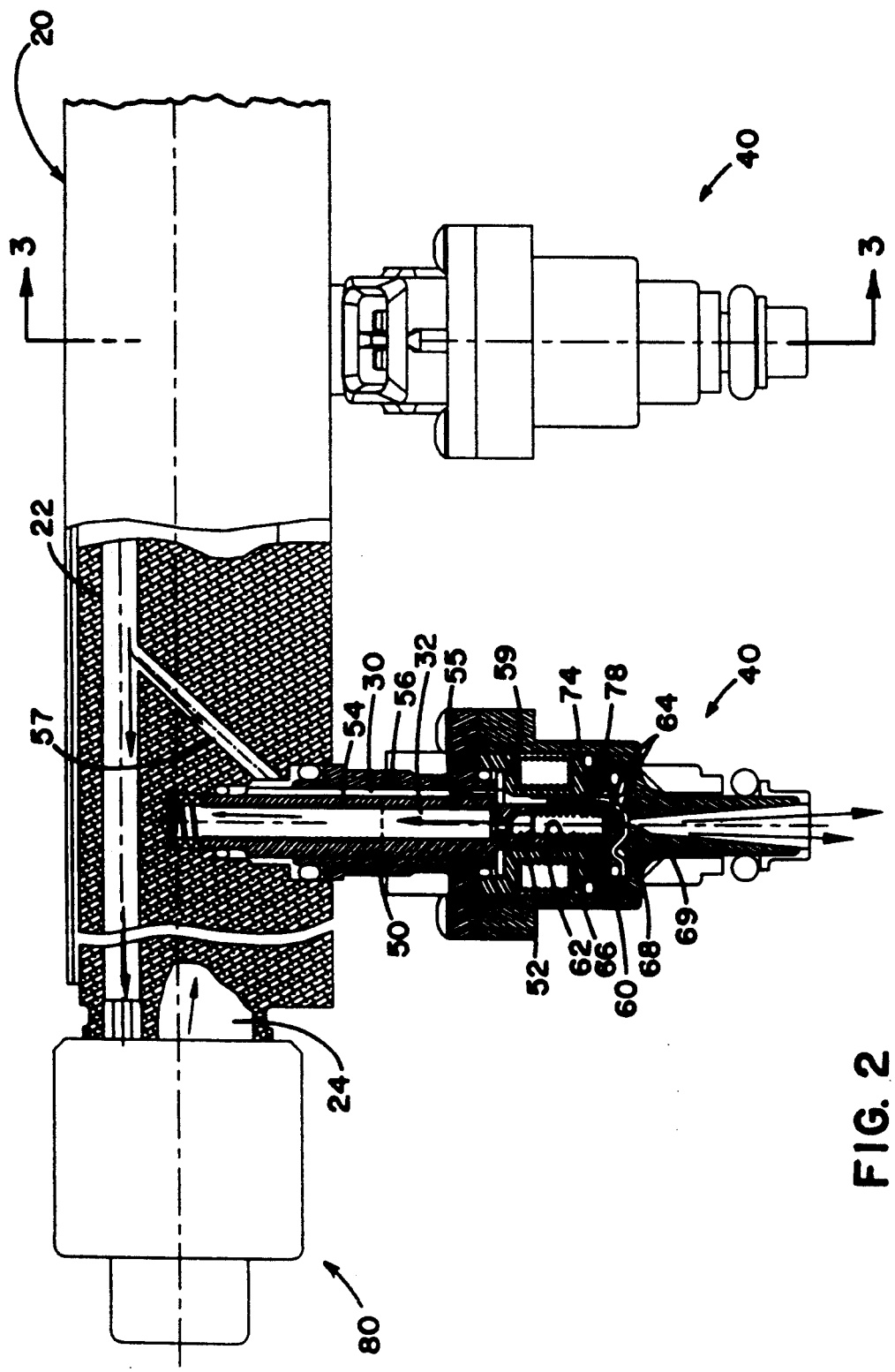
FIG. 2 is an enlarged partial cross-sectional front view of a fuel injecting mechanism and a fuel rail assembly according to the present invention.

Fuel rail assembly 20 includes a first cooling mechanism. Fuel supply 22 and fuel return 24 channels are in fluid communication at the downstream terminus of fuel supply channel 22 via a fuel pressure regulator 80, as shown in FIG. 2. Decreased pressure in fuel return channel 24 relative to fuel supply channel 22 brings the LPG in return channel 24 closer to its vapor pressure and thus its boiling temperature. This decreased pressure, as well as engine compartment heat, causes some LPG flowing through fuel return channel 24 to undergo a phase change from a liquid state to a gaseous state. The phase change requires heat, which therefore is absorbed from fuel supply channel 22, thus cooling the fuel flowing through fuel supply channel 22. That is, the proximity of fuel supply 22 and fuel return 24 channels allows fuel passing through return channel 24 to draw heat through common wall 23 and cool the fuel flowing through fuel supply channel 22. In addition, fins 26 extend from supply channel 22 toward return channel 24 to aid in heat transfer from supply 22 to return 24 channel. Preferably, fuel rail assembly 20 is installed on engine 18 at a slight angle with regulator 80 at the high end. This helps drain contaminants which may accumulate.

Referring to FIG. 1, safety shut-off solenoid valves 100 are preferably used for each fuel line to keep fuel from flowing from reservoir 100 in case there is a leak during an engine shutdown and to prevent leaks during disassembly. Shut-off solenoids 100 can also double as pressure relief valves to vent excess pressure from the injectors 40 and fuel rail assembly 20 after a hot engine shut down.

Fuel injectors 40 are in fluid communication with supply 22 and return 24 channels of fuel rail assembly 20. Referring to FIG. 3, cap 44 is secured to housing 42 of fuel injector 40. Bushing 50 is secured within cap 44 and is held in place by a spring 58 at its upper end which biases shoulder 53 of bushing 50 against aligning washer 59. Referring to FIG. 2, a peripheral groove 56 extends vertically along bushing 50. Supply fuel from fuel supply channel 22 of fuel rail assembly 20 flows through connecting channel 57 downward through groove 56, under pressure from fuel pump 16. Supply fuel then flows through slots in aligning washer 59, bobbin 74, and magnet ring 78, progressing to the area between valve 60 and metering washer 68. Fuel passages 64 in valve 60 allow supply fuel to enter central chamber 62 within valve 60.

Fuel injection mechanism 40 includes a second cooling mechanism. Flow restrictor 52 causes a pressure drop between supply fuel in central chamber 62 of valve 60 and return fuel flowing upward through hollow core 54 in bushing 50. The preferred pressure drop is approximately 50 to 60 psi. In the preferred embodiment, flow restrictor 52 is a porous metal filter pressed into bushing 50. Other restrictors, such as a small orifice or a valve, however, could also be used. Flow across restrictor 52 is approximately constant in the preferred embodiment When the supply fuel is at a sufficiently high temperature, LPG will vaporize as it passes through flow restrictor 52. The phase change that occurs during vaporization causes heat to be absorbed from common wall 55 and consequently also from the supply fuel flowing through peripheral groove 56 of bushing 50, thus cooling the supply fuel as it passes downward. The passages through which supply fuel flow from fuel rail assembly 20 to flow restrictor 52 define second fuel supply channel 30, and passages through which fuel flows back to the fuel rail 20 from flow restrictor 52 define second fuel return channel 32. Thus, the heat transfer takes place as a result of the countercurrent flow of LPG in a significant portion of second supply 30 and return 32 channels. This internal injector refrigeration aids in cooling LPG to a fully liquid state prior to injection into intake manifold 19 of engine 18.

Valve 60 is biased toward metering washer 68 by spring 66, which is disposed at its upper end against flow restrictor 52. Valve 60 is vertically movable between open and closed positions, allowing fuel to be injected through fuel flow orifice 69 of metering washer 68 when valve 60 is in the open (i.e., "up") position.

The amount of fuel injected into intake manifold 19 is controlled by ECU 90, shown in FIG. 1. ECU 90 takes into account changes in fuel supply pressure and temperature. Pressure 94 and temperature 92 sensors in fuel supply channel 22 of fuel rail assembly 20 provide such information to ECU 90. A modification to the algorithm commonly used in ECU's for gasoline engines is required. Examples of commercially available microprocessors capable of carrying out this function include: Motorola 68332, 68HC11; Intel 8X96H, 8XC196, 8061; or Texas Instruments TM5320DSP. The modified algorithm must account for variations in fuel supply temperature and pressure in addition to engine parameters already commonly input, such as engine RPM, exhaust emissions, engine temperature, and intake manifold pressure.

Referring to FIG. 3, when ECU 90 determines the need for fuel, it sends an electrical current to spade connector 70 within socket 72 of fuel injector 40. Windings 76 within bobbin 74 are electrified, and the resultant magnetic flux causes valve 60 to be drawn upward, allowing fuel to pass through orifice 69 of metering washer 68 and into intake manifold 19. When ECU 90 discontinues the electrical current, valve spring 66 returns valve 60 downward to its closed position.

To achieve the desired refrigeration in both fuel rail assembly 20 and injection mechanism 40, fuel pump 16 must be capable of maintaining the fuel pressure in supply channel 22 at least 15 and up to 100 psi above the fuel pressure in the return channel 24. Commercially available pumps are suitable for this purpose, such as the Walbro 5000 Series in-tank model. Fuel pressure regulator 80 maintains a relatively constant pressure differential between fuel supply 22 and return 24 channels of fuel rail assembly 20. In cooperation with fuel pump 16, regulator 80 preferably maintains a fuel pressure differential of approximately 50 to 60 psi. Commercially available hydromechanical bypass pressure regulators are suitable for this purpose, such as a Bosch gasoline electronic fuel injection regulator. However, regulator 80 does not need to be referenced to intake manifold 19 pressure due to the small variations in intake manifold pressure relative to the high injection pressures associated with the system.

This design allows for maximum cooling of injected LPG when it is most needed. At full throttle, supply fuel is flowing through fuel injector 40 into intake manifold 19 at its maximum rate. Cooling is not a great concern due to the short residence time of LPG for absorption of heat from fuel injector 40 and the engine compartment. At idle, however, more cooling of supply fuel is required, due to the longer residence time of LPG in fuel injector 40 and higher engine compartment heat. Because the amount of fuel injected is very small at the idle condition, regulator 80 bypasses the maximum amount of fuel to fuel return channel 24. Thus, fuel is flowing through return channel 24 at its maximum rate during the idle condition. This results in maximum cooling of the LPG flowing through supply channel 22 prior to reaching fuel injectors 40.

It should be understood that the present invention is not limited to the preferred embodiment discussed above, which is illustrative only. Changes may be made in detail, especially in matters of shape, size, arrangement of parts, and material of components within the principles of the invention, to the full extend indicated by the broad general meanings of the terms in which the appended claims are expressed.

What is claimed is:

1. A fuel supply system for providing liquified petroleum gas fuel to an internal combustion engine, the engine having an intake manifold, said fuel supply system comprising:
    a fuel supply assembly including a fuel rail assembly having a first fuel supply channel and a first fuel return channel, the fuel rail assembly having first means for cooling fuel flowing through the first supply channel; and
    means for injecting fuel, the injecting means having a second fuel supply channel and a second fuel return channel, the second fuel supply and return channels being in operable fluid communication with the first fuel supply and return channels, respectively, the fuel injecting means having second means for cooling fuel prior to injection into the intake manifold.

2. The fuel supply system of claim 1 wherein the first fuel cooling means includes means for providing reduced fuel pressure in the return channel relative to the supply channel, the reduced pressure providing means allowing a phase change of some of the liquified petroleum gas to a gaseous state to occur as it flows through the first fuel return channel.

3. The fuel supply system of claim 1 wherein the second fuel cooling means comprises means for restricting fuel flow so as to maintain a reduced fuel pressure in the second fuel return channel relative to the second fuel supply channel, thereby allowing for some phase change of the liquified petroleum gas to a gaseous state to occur.

4. The fuel supply system of claim 3 wherein a portion of the second fuel return channel and a portion of the second fuel supply channel have a first common wall, the liquified petroleum gas in the second return channel flowing countercurrent to the liquified petroleum gas in the second fuel supply channel.

5. The fuel supply system of claim 1 wherein the first fuel supply channel and the first fuel return channel are disposed within the fuel rail with a second common wall between them.

6. The fuel supply system of claim 1 wherein the fuel supply assembly includes means for generating pressure in fluid communication with the first fuel supply channel.

7. The fuel supply system of claim 6 wherein the fuel supply assembly further comprises means for regulating fuel pressure in the first supply and return channels, the fuel pressure regulating means maintaining the fuel pressure of the first supply channel at a predetermined pressure differential above the fuel pressure in the first return channel by bypassing fuel from the first supply channel to the first return channel when the predetermined pressure differential is exceeded 8. The fuel supply system of claim 7 wherein the pressure generating means is capable of maintaining the fuel pressure in the first fuel supply channel at least 15 p.s.i. above the fuel pressure in the first fuel return channel 9. The fuel supply system of claim 1 wherein the injecting means includes electrical computer means for controlling the rate of fuel injected.

10. The fuel supply system of claim 9 wherein the electrical computer means is responsive to changes in fuel pressure and temperature in the first fuel supply channel.

* * * * *